United States Patent [19]
Anderson et al.

[11] 3,758,071
[45] Sept. 11, 1973

[54] MAGNETICALLY-ACTUATED FLUID CONTROL VALVE

[75] Inventors: Victor C. Anderson, San Diego, Calif.; Ronald C. Horn, New Brighton, Minn.

[73] Assignee: The United States of America as represented by the Secretary of the Navy, Washington, D.C.

[22] Filed: Nov. 26, 1971

[21] Appl. No.: 202,286

[52] U.S. Cl. ............................... 251/139, 251/141
[51] Int. Cl. .......................................... F16k 31/06
[58] Field of Search ........................... 251/141, 139

[56] References Cited
UNITED STATES PATENTS

| | | | |
|---|---|---|---|
| 3,498,330 | 3/1970 | Paige | 251/141 X |
| 3,586,287 | 6/1971 | Knobel | 251/141 X |
| 3,433,256 | 3/1969 | Stillhard et al. | 251/139 X |
| 1,911,618 | 5/1933 | Hapgood | 251/141 X |

*Primary Examiner*—Arnold Rosenthal
*Attorney*—R. S. Sciascia

[57] ABSTRACT

A body member formed as a solid block of high purity iron is provided with an axial bore forming a fluid inlet passage and a planar end wall surrounding the bore. The valve member which blocks the inlet flow also is shaped as a solid block formed of high purity iron. Further, this latter member is slidably carried in a casing and itself has a planar end wall adapted to flushly engage the end wall of the valve body member and, when so engaged, to block the inlet flow. The body member carries an electric coil to magnetize the high purity iron pieces and cause the valve member to move into its flow-blocking position. When the coil is not energized, fluid flow admitted through the axial bore spreads laterally and forces the valve member away from the valve body member to create a gap in the order of 0.010 inch. This small stable gap allows closure of the valve with very low electrical power.

4 Claims, 2 Drawing Figures

PATENTED SEP 11 1973  3,758,071

VICTOR C. ANDERSON,
RONALD C. HORN,
INVENTORS.

MAGNETICALLY-ACTUATED FLUID CONTROL VALVE

BACKGROUND OF THE INVENTION

1. Field of the Invention

The present invention relates to magnetically actuated valves and, in particular, to magnetically-actuated valves which utilize Bernouli fluid flow forces to hold the valve open.

2. Description of the Prior Art

There are some examples in the prior art of magnetically actuated valves which utilize fluid flow forces to promote valve opening and which also utilize a magnetic circuit to cause the valve to close. For the most part, however, these valves are rather complicated, expensive and in some instances seem to be unstable and difficult to maintain.

Further, some of these valves are not of a type which allows closure of the valve using very low electrical power. Obviously, the ability to conserve electrical power becomes a significant consideration particularly when the situation requires the use of battery power and the power must be available for long periods of time. Electrical power is at a premium particularly in underwater, air or space applications, as well as a number of other applications where the valve-controlled equipment is required to operate in a remote location in which it cannot readily be serviced.

SUMMARY OF THE INVENTION

The fluid control valve apparatus includes a valve body member shaped as a solid block and provided with a substantially planar end wall. A bore extending through the block axially of the wall provides a fluid inlet passage and the block also mounts an electrically energizable coil. The valve member, used to block the flow through the inlet passage, also is shaped as a solid block and also is provided with a substantially planar end wall which is peripherally coextensive with the end wall of the body member. These planar end walls are adapted to flushly engage one another to block the inlet flow. To permit the valve to open, one of the members, preferably the valve member, is movable relatively to the other so that, when fluid pressure is applied through the inlet, this pressure can force the one member away from the other to produce a small gap through which the inlet flow can proceed in a radially outwardly direction. Effluent means are provided to receive the radial flow and, most suitably, these means communicate with the entire peripheral extent of the gap produced when the members move apart. The valve is closed magnetically and, for this purpose, both of the members are formed of a magnetic material, such as high purity iron, so that, when energized by the coil, a magnetic circuit is produced to draw the members together and hold them in the valve-closing disposition.

OBJECTS OF THE INVENTION

A primary object of the invention is to provide a magnetically actuated valve utilizing Bernouli fluid forces to open the valve and also utilizing electromagnetic forces to close it, the arrangement being such that the closing can be accomplished with the use of very low electrical power.

Another object is to provide a fluid control valve functioning in the manner defined in the foregoing object, the valve being unusually simple and inexpensive both in design and operation.

Yet another object consistent with the foregoing objects is to provide a magnetically-actuated valve which is reliable, stable and unusually sensitive to applied forces so as to be capable of operating when the applied forces are relatively small.

Other objects and their attendant advantages will become apparent in the ensuing detailed description.

BRIEF DESCRIPTION OF THE DRAWINGS

An embodiment of the invention is illustrated in the accompanying drawings of which.

DETAILED DESCRIPTION OF THE ILLUSTRATED EMBODIMENT

Before proceeding with the description, it should be noted that the drawings illustrate the invention in a rather schematic manner to the extent that a number of structural details, such as special fittings and fastenings, are not shown. However, these details are purely mechanical and in any reduction to practice they easily can be provided in any form which may be desired.

Figure 1:
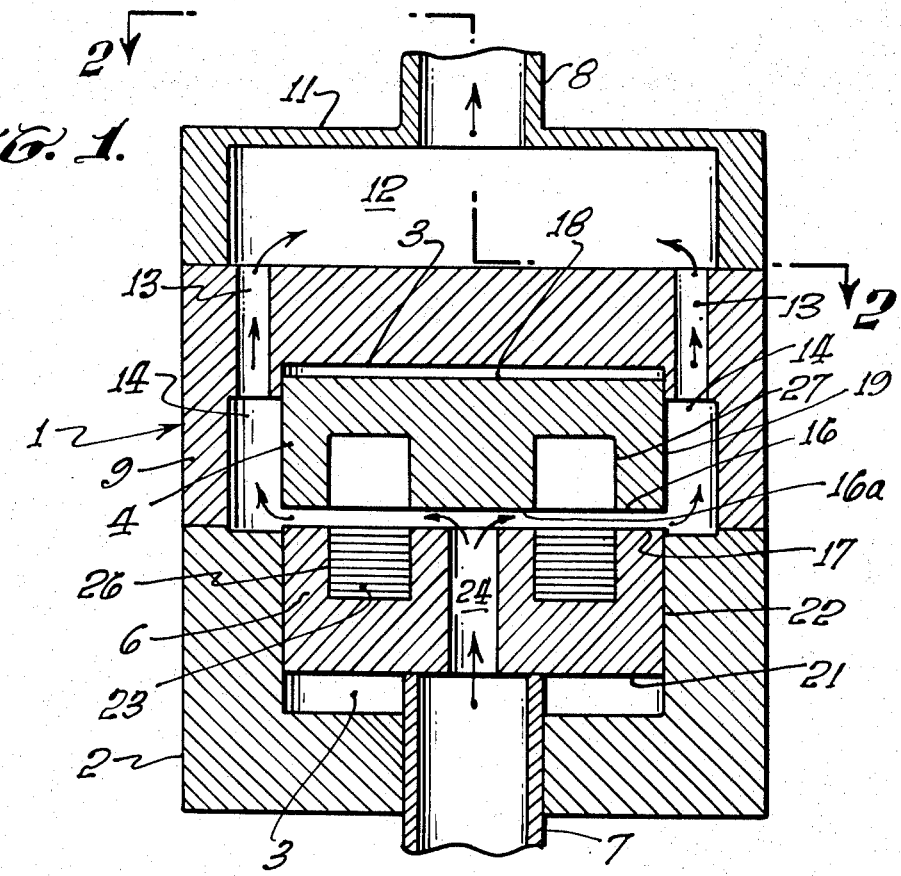
FIG. 1 is a top view of the control valve.
Figure 2:
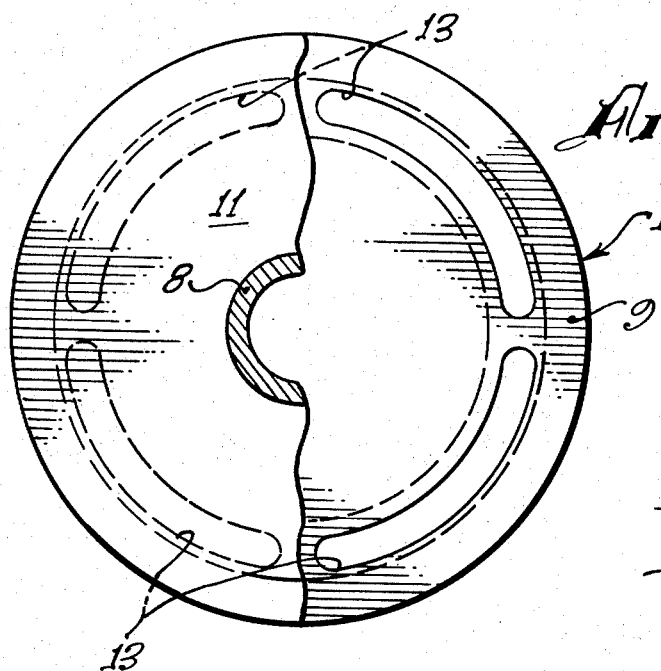
FIG. 2 is a central section taken along lines 2—2 of FIG. 1.

Referring principally to FIG. 2, the flow control valve apparatus includes a casing which, for descriptive purposes, can be considered as being formed of an upper part 1 and a lower part 2. As shown, these two parts are disposed in flush engagement one with the other and, when so engaged, they mutually provide an interior chamber 3 in which are mounted a valve member 4 and a valve body member 6.

Fluid flow is admitted through an inlet conduit 7 mounted in the lower wall of part 2 of the casing and effluent flow proceeds outwardly through a conduit section 8 disposed centrally in the upper wall of upper casing member 1. In this regard, it should be noted that upper casing member 1 itself is formed of two parts 9 and 11, part 9 being somewhat similar in shape to part 2 of the casing and part 11 being a cap portion having an enlarged interior chamber or manifold 12 to collect the effluent and discharge it through conduit 8. It further should be noted that part 9 of the casing is formed with a plurality of arcuate effluent passages 13, these passages communicating at their lower ends with an effluent chamber 14 which, as will be seen, is more specifically a radial enlargement of interior chamber 3. In effect, lower casing member 2, as well as part 9 of upper casing member 1 both are provided with cup shaped chambers, the principal difference being that the chamber formed in part 9 has a stepped portion to provide radial enlargement 14.

Valve member 4 and valve body member 6 provide the functional components of the present apparatus. Both of these portions are shaped as solid blocks and are in the form of short cylinders carried adjacent one to the other, both further being provided with planar end walls 16 and 17 which, when the valve is not subjected to fluid or electromagnetic force, rest in a flush engagement one on top of the other. Valve member 4 also has an upper wall 18 and a side wall 19 that slidably engage a short section of the interior wall of chamber 3. In turn, valve body member 6 has a lower wall 21 sealably engaged with conduit 7 and a side wall 22, this member preferably being fixedly mounted in the lower portion of chamber 3 so that upper valve member 4 slidably moves relative to it.

Another feature of the present invention is that solid blocks 4 and 6 both are formed of a magnetic material, such as high purity iron and an electrical-energizable coil 23 is mounted in block 6 to create a magnetic ciruit attracting block 4 into flush engagement with block 6. As long as the coil is energized this flush engagement is maintained. Block 6 is provided with an axial bore or passage 24 centrally disposed relative to wall 17 of this block and passage 24 communicated with conduit 7.

Most suitably, coil 23 is mounted in an annular recess 26 formed in block 6 and extending concentrically to the axis of passage 24. Similarly, block 4 is provided with an annular recess 27, this recess providing block 4 with a central cylindrical flange having a lower wall 16a which has a diameter greater than the diameter of passage 24 so that, when the two blocks are flushly engaged, surface 16a closes the upper opening of passage 24.

Other features of the invention best can be understood by considering its intended operation. First, however, it might be pointed out that the illustrated embodiment particularly contemplates the use of the valve in hydraulic systems although, as will be understood, the valve can be adapted for other fluid systems. Inlet fluid enters the valve through conduit 7 and its force is applied to surface 16a of valve member 4 through conduit 24. When there is no fluid flow entering the valve, upper valve member or block 4 rests upon block 6, it previously having been noted that block 4 is slidably mounted in the casing so that it drops by force of gravity into its flush engagement with the lower block. In other situations, it of course is possible that the entire valve apparatus may be disposed horizontally or in other orientations in which the force of gravity would not apply. If so, appropriate resilient means can be incorporated as a substitute for gravity.

When inlet flow first is initiated, its force applies itself to surface 16a and tends to expand radially from the axis of conduit 24 across the interface of the two blocks. This radial flow across the planar interface, in turn, forces block 4 to slide upwardly in its chamber a fixed amount depending upon the pressure being exerted and the mass of the block. As will be understood, the force which moves the block upwardly is what is known as the Bernouli fluid force produced by the high velocity of the radial flow of the fluid. As will be noted, the present flow is laminar across the valve seat. The arrangement is such that the pressure force moves the mass of block 4 sufficiently to create a gap in the order of 0.010 inch, this small stable gap being one of the significant features that permits closure of the valve in response to very low electrical power. For example, in one embodiment the valve closes upon the application of 300 milliwatts against a fluid pressure of 100 psi. The fluid, of course, proceeds radially through the gap into enlarged effluent chamber 14 and on through openings 13 into manifold 12 for discharge through conduit 8.

Energization of coil 23 produces a magnetic path or circuit extending through both blocks 6 and 4 and the arrangement is such that when these blocks are magnetized, block 4 is attracted into flush engagement with block 6 against whatever pressure may be applied through inlet passage 24. As just indicated, if the gap between the members is sufficiently small, a relatively minor amount of electrical energization is needed to close the valve against such pressures as 100 psi. The flow through inlet passage 24 then is closed by the valve seat provided by surface 16a and the valve apparatus will remain closed until the coil is deenergized. Reopening then becomes responsive to the establishment of the Bernouli fluid forces.

Aside from the advantages which have been pointed out, particularly those which involve the ability of the valve to function in response to minimum electrical energization, it should be noted that the present arrangement is one which is unusually stable and reliable in that it uses relatively few block-like parts, the movement of which relative one to the other is quite small and easily guided or controlled to the extent that constant maintenance or adjustment should not be required. It also will be appreciated that the parts themselves can be fabricated inexpensively and in large quantity so that the valve structure as a whole should be well suited both to economic fabrication and use.

Obviously many modifications and variations of the present invention are possible in the light of the above teachings. It is therefore to be understood that within the scope of the appended claims the invention may be practiced otherwise than as specifically described.

We claim:

1. Hydraulic fluid pressure control valve apparatus comprising:

a cylindrically shaped block-like valve body member provided with a substantially planar end wall having a fluid pressure inlet opening disposed centrally of said wall and a continuous recess formed in said end wall a spaced distance from said opening, an electrically energizable coil mounted in said recess, a cylindrically shaped block-like valve member also having a substantially planar end wall surface co-extensive with the planar end surface of said valve body member whereby said co-extensive surfaces can be brought into a mated engagement one with the other, said valve member end wall further having a continuous extent sized to block said fluid pressure inlet opening when said members are mated, a valve casing for said members, said casing having inlet and outlet ports and said valve member being reciprocable within said casing into and out of said pressure blocking engagement with said valve body member, said valve and body members both being formed of a magnetic material whereby energization of said coil produces a magnetic circuit, means for exerting a predetermined force resiliently urging said valve member into a normally closed inlet-blocking disposition wherein said flushly mated end wall surfaces provide a continuous path for said magnetic circuit for holding said valve member in said inlet-blocking disposition against said inlet pressure, de-energization of said coil permitting said inlet fluid pressure to move said valve member for producing a gap the size of which is dependent upon the resistance which said predetermined force acting on the valve member offers to the force exerted by the lifting component of the inlet pressure as it flows radially outwardly of from said inlet opening, said predetermined force being a constant force regulated for permitting said valve member to move away from said valve body member a minimum amount for producing a gap no greater in size than is needed for permitting a free flow of said inlet fluid radially outwardly of the gap, and effluent means for receiving said radial flow.

2. The apparatus of claim 1 wherein:

said valve casing is formed with an interior chamber and said inlet and outlet ports are disposed one near each of its opposite end portions, said valve body member being mounted in the inlet end of said chamber with its inlet opening in fluid flow communication with said inlet port and said valve member being mounted in the outlet end of said chamber, and said valve casing being formed to provide said effluent means and communicate said means with said outlet port.

3. The apparatus of claim 2 wherein said outlet end of said valve casing is formed with a manifold for receiving said effluent, said outlet port being disposed centrally of said manifold.

4. The apparatus of claim 2 wherein the mass of valve member is so related to the fluid flow pressure that the pressure force maintains a gap in the order of 0.010 inch.

* * * * *